C. B. CROFFORD.
CHURN.
APPLICATION FILED MAY 6, 1914.

1,131,336.

Patented Mar. 9, 1915.

Witnesses
Fenton S Belt
J. H. Sherwood

Inventor
C. B. Crofford
By Frank H. Hough
Attorney

UNITED STATES PATENT OFFICE.

CHARLES BOHN CROFFORD, OF BINGHAMTON, TENNESSEE.

CHURN.

1,131,336. Specification of Letters Patent. Patented Mar. 9, 1915.

Application filed May 6, 1914. Serial No. 836,741.

*To all whom it may concern:*

Be it known that I, CHARLES B. CROFFORD, a citizen of the United States, residing at Binghamton, in the county of Shelby and State of Tennessee, have invented certain new and useful Improvements in Churns; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in churns and especially in the provision of a particular form of construction of churn body whereby with its use in connection with a dasher a powerful agitation of the cream may be obtained and affording means whereby cream may be churned in the least possible time.

My invention comprises more specifically a churn body having a series of vertical concaved inner surfaces at the corners thereof and affording means' whereby the eddies may be produced and at the same time dispensing with the usual angular corners which are difficult to cleanse and consequently insanitary.

The present invention comprises various details of construction and combinations and arrangements of parts which will be hereinafter fully described, shown in the accompanying drawings and then specifically defined in the appended claim.

I illustrate my invention in the accompanying drawings, in which:—

Figure 1:
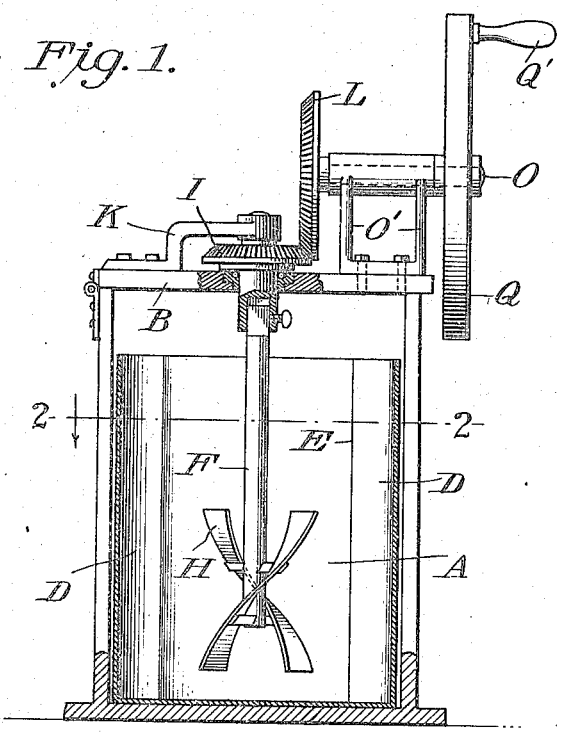
Figure 2:
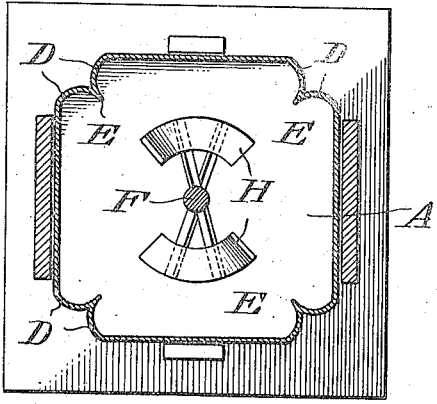

Figure 1 is a vertical central sectional view through a churn made in accordance with my invention, and Fig. 2 is a cross-sectional view through the body portion thereof.

Reference now being had to the details of the drawings by letter, A designates the body of a churn which has double concaved surfaces, designated respectively by letters D, formed at each corner of the body of the churn, the inner marginal edges of said surfaces terminating in a ridge E. The churn body is provided with a suitable top B in which is journaled the dasher shaft F having wings H which may be of any improved construction which may be found best to operate in connection with the churn body. Said dasher shaft, which is journaled in the member K, is provided with a beveled pinion I which is in mesh with a similar pinion L fixed to the horizontally disposed shaft O mounted in suitable bearings in the standards O' upon the top of the churn and a suitable fly wheel Q is also fixed to the shaft O and has a handle Q' for rotating the same.

The operation of my churn will be readily understood and is as follows:—By the rotary movement of the dasher, the wings thereof will cause a whirling agitation to the cream within the body portion and, as it comes in contact with the concaved surfaces, a violent agitation of the cream will be caused, making it possible to churn the cream in a minimum length of time. By reason of the double concaved surfaces, it will be noted that the same effect upon the agitation of the cream may be produced by rotating the dasher in either direction.

What I claim to be new is:—

A churn comprising a body portion having opposite parallel sides with double concaved portions at each corner, the adjacent edges of the concaved portions terminating in an inwardly extending ridge, and a vertically disposed, rotatable winged dasher, as shown and described.

In testimony whereof I hereunto affix my signature in presence of two witnesses.

CHARLES BOHN CROFFORD.

Witnesses:
SAM. E. JOHNSON,
MYRTLE SLAUGHTER.